United States Patent Office 3,287,433
Patented Nov. 22, 1966

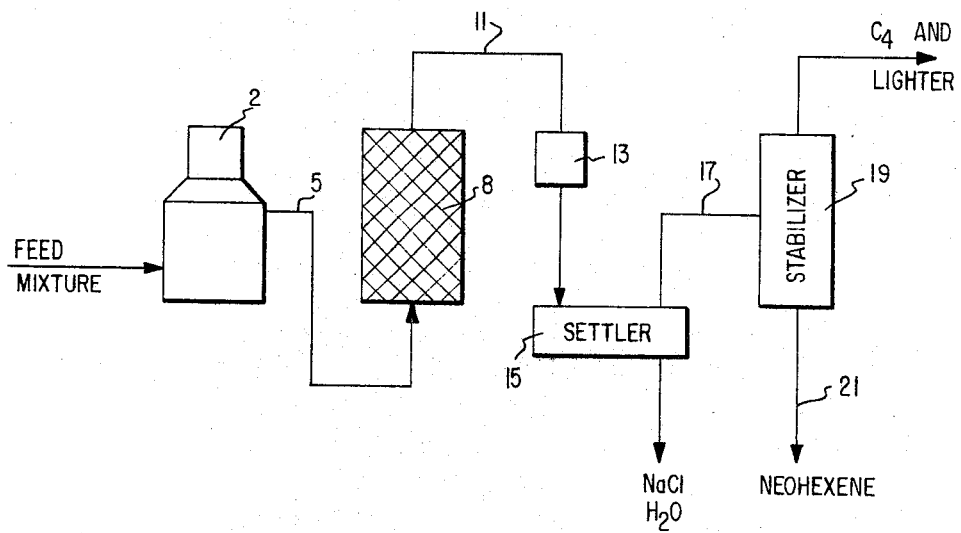

3,287,433
PROCESS FOR THE SEPARATION OF MIXTURES OF TERTIARY BUTYL CHLORIDE AND 3,3-DIMETHYLBUTENE-1
Emmett H. Burk, Jr., Hazel Crest, and Byron W. Turnquest and Calvin J. Bragg, Chicago, Ill., assignors to Sinclair Research, Inc., New York, N.Y., a corporation of Delaware
Filed Jan. 15, 1964, Ser. No. 337,783
5 Claims. (Cl. 260—677)

This invention is directed to a process for the separation of mixtures of tertiary butyl chloride and 3,3-dimethylbutene-1.

3,3-dmethylbutene-1, also known as neohexene, has recently been found to be a valuable alpha-olefin for the production of polymers of high melting point. For example, it has been reported in Linear and Stereoregular Addition Polymers, Gaylord and Mark, Interscience Publishers Inc., New York, 1959, page 64, that isotactic poly-3,3-dimethyl-1-butene has been produced having a melting point of approximately 300° C. Also a copolymer of ethylene and 3,3-dimethylbutene-1 has been made using a conventional peroxide catalyzed polymerization process which copolymer is characterized by being more flexible and having an increase in extensibility of 300 to 500 percent over low density polyethylene. (See U.S. Patent No. 2,728,752 to H. C. Brown.)

When neohexene is to be used as a monomer for the production of the above-mentioned polymers, it is, of course, essential that it be free of contaminants. Unfortunately, in the preparation of neohexene by the dehydrohalogenation of 1-chloro-3,3-dimethylbutane and its subsequent separation particularly by the method disclosed in copending application Serial No. 337,863 in the names of Byron W. Turnquest, Emmet H. Burk, Jr., and Calvin J. Bragg, filed of even date herewith, the neohexene is contaminated with small amounts of tertiary butyl chloride.

Although tertiary butyl chloride can be separated from neohexene by distillation, a relatively efficient distillation tower is required for the separation. Furthermore, it has been noted that in the distillation of tertiary butyl chlordie-neohexene mixtures, the tertiary butyl chloride is often carried up a distillation column by dissociation into isobutylene and hydrogen chloride in the lower zones of the tower with recombination of the components back to tertiary butyl chloride in the upper zones. A process, therefore, which enables the separation of tertiary butyl chloride from neohexene without resort to the demanding requirements and problems of a highly effective distillation system becomes desirable.

It has now been found that a mixture consisting essentially of neohexene and tertiary butyl chloride can be separated by contacting said mixture in the vapor phase and at a temperature of about 500 to 900° F., preferably about 650 to 750° F., with elemental iron to convert selectively the tertiary butyl chloride to isobutylene and hydrogen chloride and then removing the hydrogen chloride and isobutylene. The elemental iron contact material will usually have a superficial surface area to reactor volume ratio of at least about 5 to 1, preferably at least about 50 to 1. Suitable forms for the elemental iron contact material include steel wool, Raschig rings, iron beads, steel ribbon, small tubes, etc. The contacting can conveniently be carried out at atmospheric pressures but subatmospheric or superatmospheric pressures can be employed if desired. Pressures in the range of about 50 to 150 p.s.i.g. are preferred. Ordinarily a liquid hourly space velocity (LHSV) of about 0.5 to 20, preferably about 2 to 10, is utilized.

Removal of the much lower boiling hydrogen chloride and isobutylene resulting from the contacting step of the invention can be any of the separation methods known to the art, although it is important to perform the removal of the liberated hydrogen chloride under conditions that preclude the back-addition of the hydrogen chloride to isobutylene to reform tertiary butyl chloride. For instance, it reaction product vapors are allowed to condense prior to removal of the hydrogen chloride, the chloride will partially add back to the isobutylene. A preferred method comprises maintaining the reaction product effluent from the contacting operation in the vapor phase and scrubbing it with dilute caustic solution in accordance with well-known techniques to convert the hydrogen chloride to sodium chloride and water, and then separating the sodium chloride and water from the essentially neohexene-isobutylene mixture by settling. The hydrocarbon mixture can then be subjected to simple distillation to remove the isobutylene and any lighter hydrocarbons present.

Although the method of the invention is applicable to the separation of neohexene-tertiary butyl chloride mixtures in any proportions, for instance 1 to 99% neohexene based on the weight of its mixture with tertiary butyl chloride, the most practical application is perhaps in the neohexene production and separation method disclosed in the aforementioned copending application. In this method a quaternary carbon containing hydrocarbon halide such as 1-halo-3,3-dimethylbutane is dehydrohalogenated by subjecting it in the vapor form to a temperature of about 400 to 600 or even 650° C. in a non-catalytic environment to produce neohexene in admixture with other close-boiling tertiary olefins, such as isobutylene, isoamylenes, isoprene, 2,3-dimethyl-1-butene and 2,3-dimethyl-2-butene. These tertiary olefines can be separated from the neohexene by directing the effluent from the dehydrohalogenation reaction into a holding vessel maintained under conditions that permit the hydrogen halide produced during the dehydrohalogenation to selectively rehydrohalogenate the tertiary olefins (with insignificant rehydrohalogenation of the neohexene) so as to convert the tertiary olefins to the to corresponding halides which of course includes tertiary butyl halides. The conditions generally used for the rehydrohalogenation are those which transform and hold essentially all of the hydrogen alide in the liquid phase for the selective back-addition. These conditions usually fall in the following ranges: temperature, about 20 to 150° C.; pressure, that sufficient to maintain the liquid phase, e.g. about 25 to 300 p.s.i.g.; and, for instance, a liquid hourly space velocity (LHSV) of about 0.5 to 5.0. The halides of the tertiary olefins having boiling points further removed from neohexene than their corresponding olefin derivatives can be separated by fractional distillation employing relatively inexpensive distillation equipment. Unless a very efficient system is employed, however, problems with an effective separation of the tertiary butyl halide, which is closest in boiling point to neohexene of all of the halides formed, commonly occur. The present method obviates this problem by providing a simple and efficient method for the removal of the tertiary butyl chloride, which after the fractionation commonly constitutes about 5 to 15% based on the total weight of neohexene and tertiary butyl chloride. The neohexene, of course, constitutes the essential balance or about 85 to 95% by weight.

The following example with reference to the attached schematic drawing is included to further illustrate the present invention.

A feed mixture comprising approximately 90% neohexene and 10% tertiary butyl chloride is passed into preheater 2 wherein the mixture is heated to a temperature of 700° F. The heated stream is directed via line 5 to a reactor 8 packed with steel wool through which the heated stream is passed at a weight hourly space velocity of 4. The effluent from reactor 8, consisting essentially of neohexene, isobutylene and liberated HCl is maintained in the vapor phase and passed via line 11 to scrubber 13 wherein it is scrubbed with 3 volumes of 1% caustic. The scrubbed mixture is sent to settler 15 and permitted to settle into an aqueous lower phase containing sodium chloride and an upper hydrocarbon phase of essentially neohexene and isobutylene. The aqueous phase is removed from the bottom of the settler 15 and the remaining hydrocarbon phase sent by line 17 to a stabilizer 19 which removes, by simple distillation, the isobutylene and lighter hydrocarbons. Neohexene product is removed from the stabilizer by line 21.

It is claimed:

1. A method for the separation of a mixture consisting essentially of tertiary butyl chloride and 3,3-dimethylbutene-1 which comprises contacting said mixture in the vapor phase with elemental iron at a temperature of about 500 to 900° F. to convert the tertiary butyl chloride to isobutylene and hydrogen chloride and removing said hydrogen chloride and isobutylene.

2. The method of claim 1 wherein the hydrogen chloride is removed by scrubbing with an aqueous caustic solution while maintaining the reaction product mixture in the vapor phase and wherein the isobutylene is removed by distillation.

3. The method of claim 1 wherein the elemental iron is steel wool.

4. The method of claim 3 wherein the temperature is about 650 to 750° F.

5. A method for the production and recovery of 3,3-dimethylbutene-1 which comprises subjecting 1-chloro-3,3-dimethylbutane in the vapor phase to a temperature of about 400 to 650° C. in a non-catalytic environment to produce by dehydrochlorination neohexene in admixture with $C_6$ tertiary olefins, directing the total effluent including the released hydrogen chloride from said dehydrochlorination to a holding vessel maintained at a temperature of about 20 to 150° C. and a pressure sufficient to maintain a liquid phase to selectively rehydrochlorinate said tertiary olefins, subjecting the liquid effluent from said rehydrochlorination to fractional distillation to provide a mixture composed of about 5 to 15% by weight tertiary butyl chloride and about 85 to 95% by weight neohexene, contacting said neohexenetertiary butyl chloride mixture in the vapor phase with elemental iron at a temperature of about 500 to 900° F. to convert the tertiary butyl chloride to isobutylene and hydrogen chloride, removing said hydrogen chloride by scrubbing with an aqueous caustic solution while maintaining the reaction product mixture in the vapor phase and removing the isobutylene by distillation.

References Cited by the Examiner
UNITED STATES PATENTS

| | | | |
|---|---|---|---|
| 3,225,112 | 12/1965 | Hoffman et al. | 260—677 |
| 3,227,770 | 1/1966 | Burk et al. | 260—677 |
| 3,233,006 | 2/1966 | Burk et al. | 260—677 |

ALPHONSO D. SULLIVAN, *Primary Examiner.*